2 Sheets--Sheet 1.

C. H. MAYO.

Sawing-Machine.

No. 6,317. Reissued March 2, 1875.

Witnesses.
W. E. Boardman
[illegible]

Charles Henry Mayo.
F. Curtis. Atty.

THE GRAPHIC CO. PHOTO-LITH. 39 & 41 PARK PLACE, N.Y.

2 Sheets--Sheet 2.

C. H. MAYO.

Sawing-Machine.

No. 6,317. Reissued March 2, 1875.

Witnesses.
L. A. Wall.
M. C. Boardman.

Charles Henry Mayo.
F. Curtis. Atty.

THE GRAPHIC CO. PHOTO-LITH. 39 & 41 PARK PLACE, N.Y.

UNITED STATES PATENT OFFICE

CHARLES H. MAYO, OF BATH, MAINE, ASSIGNOR, BY MESNE ASSIGNMENTS, TO HIMSELF, EDWARD GOVE, AND EDWIN W. MARBLE, OF SAME PLACE.

IMPROVEMENT IN SAWING-MACHINES.

Specification forming part of Letters Patent No. 109,436, dated November 22, 1870; reissue No. 6,317, dated March 2, 1875; application filed April 10, 1873.

*To all whom it may concern:*

Be it known that I, CHARLES HENRY MAYO, of Bath, in the county of Sagadahoc and State of Maine, have made an invention of a new and useful Improvement in Sawing-Machines; and do hereby declare the following to be a full, clear, and exact description thereof, due reference being had to the accompanying drawings, making part of this specification, and in which—

Figure 1:
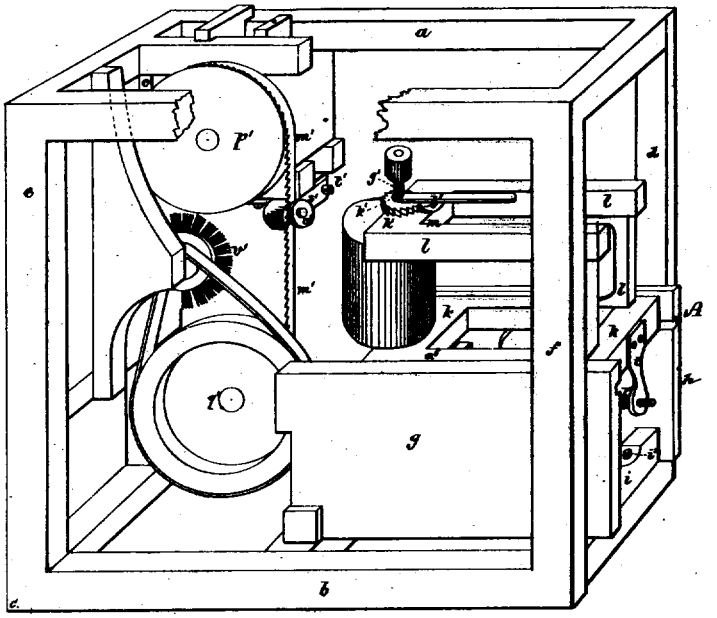
Figure 4:
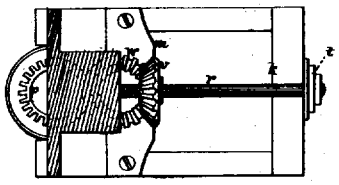
Figure 2:
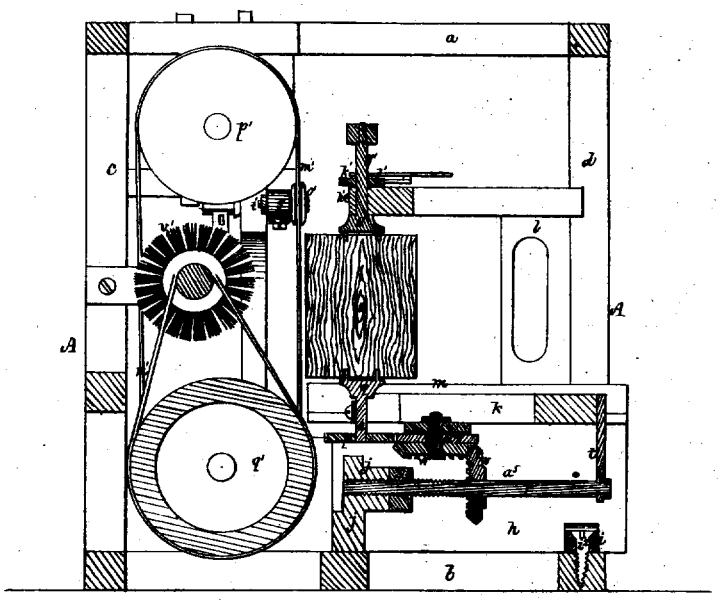
Figure 3:
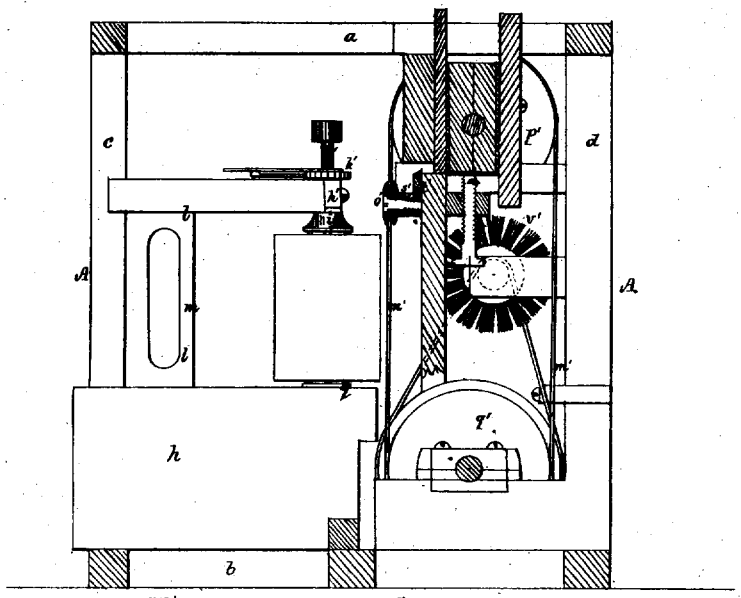

Figure 1 is a perspective view, Fig. 2 a vertical and longitudinal section, and Fig. 3 a vertical and transverse section, of a machine embodying my invention, Fig. 4 being an under-side view of the mechanism for feeding the log, to be hereinafter referred to.

The drawing accompanying this specification represents, at A, a support composed of two rectangular horizontal frames, *a b*, and four corner upright posts, *c d e f*, the support thus composed being the frame of the machine. Upon one-half of the machine, (the right, in the present instance,) and monopolizing nearly its entire width, is situated a second frame, $a^5$, composed of two side standards or guides, *g h*, and two bottom end rails, *i j*. Sliding within the guides or ways *g h* is a horizontal frame or bed, *k*, having erected upon it a gallows-frame or crane, *l*, thus producing a carriage, *m*, for containing and feeding the log to be divided by the machine. Within the forward or inner part of the bed of the carriage *m*, and in the longitudinal center of the same, is mounted a shaft, *o*, such shaft, below the bed-plate, carrying a pinion, *p*, while its upper part is formed with a head or disk, *q*, upon which the log rests, and which is furnished with a series of points or spurs to maintain the log in proper position thereupon. The feed-motions of the carriage *m* are obtained by means of a screw, *r*, disposed below its bed-plate, one end of such screw screwing through a nut, *s*, applied to the inner cross-bar *j* of the frame $a^5$, while the opposite end of the screw is swiveled to or within a hanging bearing, *t*, affixed to the rear end of the bed *k*. The revolutions of the screw *p* are effected by a beveled gear, *v*, fixed to it, this beveled gear being driven by a second beveled gear, *w*, which meshes into it, and is in turn mounted upon a stud, *x*, depending from the under side of the bed-plate *k*. The second beveled gear is driven by the pinion *p* before mentioned, through the agency of an intermediate gear, *c'*, mounted upon the stud *x'*, extending from the bottom of the plate *k*, the arrangement of the various gears and pinions being such that one revolution of the shaft *o* shall feed the carriage *k* forward a distance equal to the thickness of the board or strip which is to be produced in a convolute path from the log. Within the inner and upper part of the carriage is mounted a second upright shaft, *g'*, which revolves in a bearing or box, *h'*, and is situated in alignment with the shaft *o* below it, the lower end of the shaft *g'* carrying a suitable griper, *i'*, to seize hold of the log and secure it in a perpendicular position upon the head or disk *q*, before mentioned as making part of the shaft *o*. The rotary feed-motion of the shaft *g'* and the log, and consequently of the pinion *p*, is obtained by the ratchet $k^1$ fixed to the shaft *g'*, a driving-pawl, *l'*, driven by hand or otherwise, acting in conjunction with such ratchet in manner as will be understood by all mechanics. Or the said feed-motion may be obtained by a belt traveling about a pulley fixed to the shaft *g'*.

I would here observe that the frame $a^5$, hereinbefore mentioned, is applied to the main frame of the machine in an adjustable manner, in order that the forward end of the same, and with it the carriage and the log carried by it, may be varied with respect to the saw, as hereafter explained. This adjustment of the frame $a^5$ is obtained by pivoting its rear rail *i* to the frame of the machine, by means of a pin or bolt, $i^2$, on which the front of the frame $a^5$ turns as a center. The frame is adjusted by means of side screws and springs, or other devices usually employed in analogous cases, for the purpose of setting it and the log which it carries in any position with respect to the saw. This saw is an endless or band saw, so called, and is represented at *m'* in the accompanying drawing as supported and driven by two pulleys or drums, *p' q'*, placed one over the other, and mounted upon shafts suitably disposed, the disposition of the saw being such that its broadest area is presented to the periphery of the log, and about at right angles to the axis of the carriage $m$. The saw $m'$ travels through a grooved roller, $o'$, swiveled to the machine-frame, and immediately adjacent to the upper pulley $p'$, this roller being swiveled within a horizontal lever or bar, $s'$, which in turn is supported upon a vertical axis, $t^2$, on which it can turn, and thus vary the tangential angle with which the saw approaches the log, for the purpose of adjusting the extent of undercut or the "rankness" of the cut of the saw, as it is generally termed.

The adjustment of the horizontal lever $s'$ is effected by means of an adjusting-screw, $t^1$, and a spring interposed between the end of the lever and the part into which the end of the adjusting-screw takes.

In order to remove from the saw, when cutting the log, the attenuated strip or shaving of wood which would otherwise return to the log, and adhere to and clog the movement of the saw, and render the machine inoperative, I mount a cylindrical brush, $v'$, upon an adjacent part of the machine-frame, in such a situation and position that it shall revolve in the same general direction as that traveled by the saw, but at a much greater rate of speed, and shall impinge against the teeth of such saw, and by this means effect the removal therefrom of the shaving, as before premised.

The brush, or its equivalent, performs a very important office in cutting a continuous strip of wood spirally from about the circumference of a log with a band-saw, as without it I have been unable to effect such a result, owing to the clogging of the saw.

The mode of supporting or applying the head or frame $a^5$ to the main frame of the machine, as herein explained, is attended with valuable results, as it enables the relative position of the log in relation to the saw and its own center of support, and the longitudinal axis of the frame, to be varied, as it is well known that the more remote the cut of the saw is effected upon the log rearward of the center of its periphery the greater the hold of the saw thereupon.

I claim—

1. In a sawing-machine for sawing logs, as described, the combination of a band-saw, traveling continuously in one direction, and a revolving cleaning-brush, rotating in the same direction with, but at a different rate of speed from, the saw, and operating in connection with said saw, substantially as shown and set forth.

2. The combination of the head or frame $a^5$, swiveled as explained, the carriage $m$, and the endless band-saw $m'$, under the arrangement and for operation as herein set forth.

3. The combination, with the endless band-saw, of the directing-roller $o'$, the horizontally-vibratory roller-bar $s'$, and the devices for adjusting the position of said roller and bar, under the arrangement shown and described.

CHARLES HENRY MAYO.

Witnesses:

GEORGE W. DAVIS,
LEMUEL BURSLEY.